March 23, 1948.  J. T. LANCASTER  2,438,175
AXIALLY ENGAGING POSITIVE CLUTCH
Filed Oct. 10, 1945

Inventor
John T. Lancaster
By his Attorney

Patented Mar. 23, 1948

2,438,175

UNITED STATES PATENT OFFICE 2,438,175

AXIALLY ENGAGING POSITIVE CLUTCH

John T. Lancaster, Newton, Mass., assignor to United Shoe Machinery Corporation, Flemington, N. J., a corporation of New Jersey Application October 10, 1945, Serial No. 621,523

1 Claim. (Cl. 192—67)

This invention relates to clutches and is herein disclosed as embodied in a clutch of the type wherein the engagement between the separable clutch members is positive rather than frictional. Clutches of this type are sometimes difficult to disengage manually when transmitting a heavy load because of the friction developed between the engaging members.

It is an object of the present invention to provide a clutch of the positive type which may be easily disengaged under all conditions. In accordance with a feature of the invention, one of the interengaging clutch elements is an antifriction roll. As shown herein, this roll, which is carried upon one of the separable members, engages an abutment carried by the other member in such a way that a positive drive is transmitted between the roll and the abutment. The illustrative clutch is provided with a plurality of such rolls which engage corresponding abutments.

The invention will now be described with reference to the accompanying drawing, in which Fig. 1 is a sectional view taken in the plane of the axis of an illustrative clutch embodying the invention;

Figure 2:
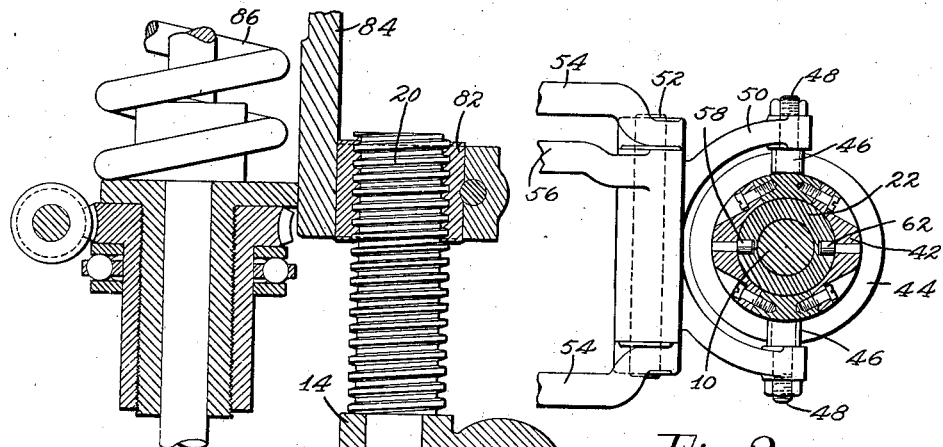
Fig. 2 is a transverse sectional view taken on the line 2—2 of Fig. 1.

The purpose of the improved clutch shown herein is to drive a shaft 10 in either direction from a gear 12 which may be driven from any suitable source of power. The shaft 10 is journaled for free rotation in fixed bearings 14 and 16 in a bracket 17 and is held against end thrust in one direction by a thrust bearing 18 and in the other direction by a shoulder which terminates an enlarged threaded end portion 20 of the shaft. The gear 12 has a hub consisting of a long sleeve 22 which rotates freely upon the shaft 10 and which is held against axial movement in one direction by engagement with an end face of the bearing 14 and in the opposite direction by engagement with a sleeve 24 which, in turn, engages an end face of the bearing 16. Freely rotatable upon the sleeve 22 is a sleeve 26 which constitutes the hub portion of a clutch member 28. Fast upon the hub 26 and held against relative rotation and axial movement with respect thereto by a tight-fitting key 29 is a bevel gear 30. Secured upon the sleeve 24 and to the shaft 10 by a pin 32 is a bevel gear 34. Journaled for free rotation in a bearing 38 in the bracket 17 is a shaft 36 carrying a bevel gear 40 which is constantly in mesh with the gears 30 and 34 and which transmits the drive of the gear 30 to the gear 34 in a reverse direction. The sleeve 26 is held against downward sliding on the sleeve 22 by the engagement of the gear 30 with the gear 40.

Figure 4:
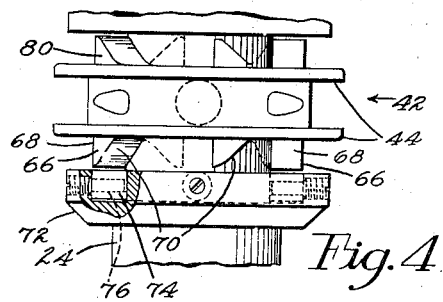
Fig. 4 is a view in elevation with a portion of the mechanism broken away showing the interengaging clutch members.

Slidably mounted for axial movement upon the sleeve 22 is a shiftable clutch member 42 (Fig. 4) having a pair of flanges 44 which between them form a peripheral groove. The sleeve 22, which is a rotary element, thus constitutes a support for the slidable clutch member 42. A pair of diametrically opposite rolls 46 (Fig. 2) carried by pins 48 mounted in the ends of a yoke 50 engage the groove formed by the flanges 44. The yoke 50 is fulcrumed upon a pin 52 mounted in a supporting bracket 54 and has an arm 56 extending from its hub which may be manually operated to swing the yoke about its fulcrum and thereby shift the clutch member 42 axially. While the clutch member 42 is free to move axially upon the rotating sleeve 22, it is keyed thereto to prevent relative rotation. The key arrangement consists of a pair of antifriction rolls 58 freely rotatable upon pins carried by the clutch member 42 and engaging a longitudinal slot 60 formed in the sleeve 22. An additional pair of rolls 62 also carried by the clutch member 42 and positioned diametrically opposite the rolls 58 engage a longitudinal slot 64 formed in the sleeve 22.

Figure 3:
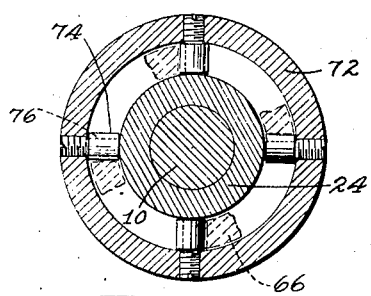
Fig. 3 is a transverse sectional view taken on the line 3—3 of Fig. 1.

Formed upon the intermediate clutch member 42 are a plurality of lugs 66 having abrupt abutment faces 68 which extend in planes parallel to the axis of the clutch and slightly offset from radial. The lugs 66 are backed off by sloping faces 70. Integral with the sleeve 24 is a clutch member in the form of a dished flange 72 which carries a plurality of antifriction rolls 74, each roll being mounted upon a pin 76 secured in the peripheral portion of the flange 72. Each of the rolls 74 is engageable with one of the abutment faces 68, and the extent to which the abutment face is offset from the radial is equal to half the diameter of the roll to insure engagement of the roll along its full length with the abutment face. Fig. 3 shows the rolls engaging the abutments, which in this figure, are indicated by broken lines because they are back of the plane in which the section is taken. The direction of rotation of the clutch member 42 is such as to make the abrupt face 68 of each lug 66 the leading face and the sloping face 70 the trailing face. The slope of the trailing face 70 provides a maximum of clearance space between the lugs consistent with a maximum strength of the lugs, affording easy entry of the rolls between the lugs when the clutch member 42 is rotating at relatively high speed.

The clutch member 28 consists of a flange dished similarly to the flange 72 and carrying a set of antifriction rolls 78 (Fig. 1) in all respects similar to the rolls 74. These rolls 78 engage a set of lugs 80 similar to the lugs 66 and extending from the intermediate clutch member 42.

Figure 1:
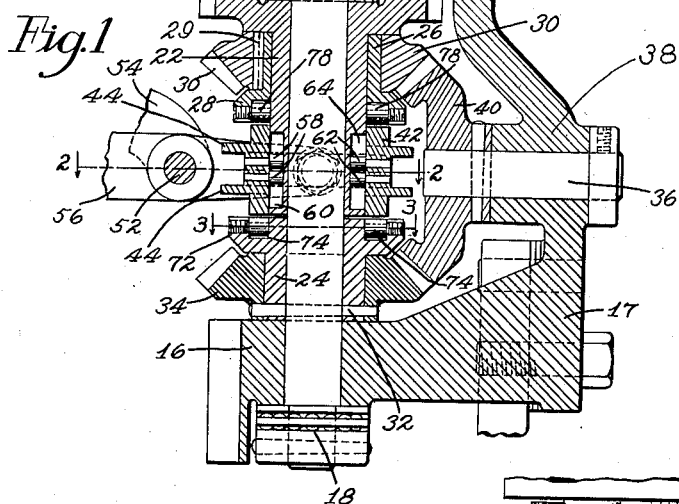

The intermediate clutch member 42 may occupy a neutral position, as shown in Fig. 1, wherein it does not engage either the rolls 78 or the rolls 74, or it may engage either set of rolls to the exclusion of the other set. Assuming the intermediate member 42 to be in the neutral position, the drive from the gear 12 will not be transmitted to either of the gears 30 or 34. If, now, the intermediate member 42 is shifted upwardly from the position shown in Fig. 1, the abutment surfaces of the lugs 80 will be brought into a position wherein continued rotation will bring them into engagement with the rolls 78, causing the gear 30 to be driven in the same direction as the gear 12 and, through the gear 40, causing the gear 34, and thereby the shaft 10, to be driven in an opposite direction. If, on the other hand, the intermediate member 42 is shifted downward, the lugs 66 will engage the rolls 74 and will drive the sleeve 24, and thereby the shaft 10, in the same direction as the gear 12.

This clutch, among various uses, may be included to advantage in a machine of the type disclosed in application for United States Letters Patent Serial No. 582,043, filed in my name on March 10, 1945, for Pressure mechanisms. In that machine, the screw corresponding to the threaded end 20 of the shaft 10 engages a nut 82 clamped to a slide 84 which operates through a spring 86 to exert pressure. It is convenient in machines of the type disclosed in my copending application above referred to, to release the clutch through the operation of a part of the machine which is driven indirectly from the member 84, that is, which is driven through the clutch. It is therefore desirable in such machines to provide clutches not only which disengage easily but in which the movement of separation of the interengaging clutch members will be aided by the operation of the clutch itself. This condition is fulfilled in the clutch illustrated herein by reason of the fact that the rolls, as soon as the abutment faces have been retracted past the center lines of the rolls, will exert upon the lugs a camming action which tends further to separate the clutch members.

Having described my invention, what I claim as new and desire to secure by Letters Patent of the United States is:

In a rotary clutch, a driving member, a driven member, at least one antifriction roll journaled for idle rotation on one of said members with its axis substantially radial with respect to the axis of rotation of the clutch, a plurality of abutments on the other clutch member, and means for shifting one of said clutch members axially to engage said roll with and disengage it from one of said abutments, each of said abutments having a leading and a trailing face, one of said faces being plane and parallel to and slightly offset from the axis of the clutch for drive-transmitting engagement with said roll and the other face being sloped away from said drive-transmitting face to provide a maximum of circumferential clearance space between the abutments for easy entry of the roll between the abutments and also to provide for the abutment a maximum of strength consistent with such clearance space.

JOHN T. LANCASTER.

REFERENCES CITED

The following references are of record in the file of this patent:

UNITED STATES PATENTS

| Number | Name | Date |
|---|---|---|
| 392,610 | Hoffman | Nov. 13, 1888 |
| 499,226 | Heineke et al. | June 13, 1893 |
| 900,578 | Nichols | Oct. 6, 1908 |
| 1,006,551 | Hendrickson | Oct. 24, 1911 |
| 1,331,891 | Arbeitel | Feb. 24, 1920 |
| 1,646,646 | Gaylord | Oct. 25, 1927 |
| 1,686,989 | Ridley | Oct. 9, 1928 |
| 1,987,682 | Hunt | Jan. 15, 1935 |
| 2,050,910 | Zancan | Aug. 11, 1936 |
| 2,390,792 | Jespersen | Dec. 11, 1945 |